United States Patent Office 2,924,114
Patented Feb. 9, 1960

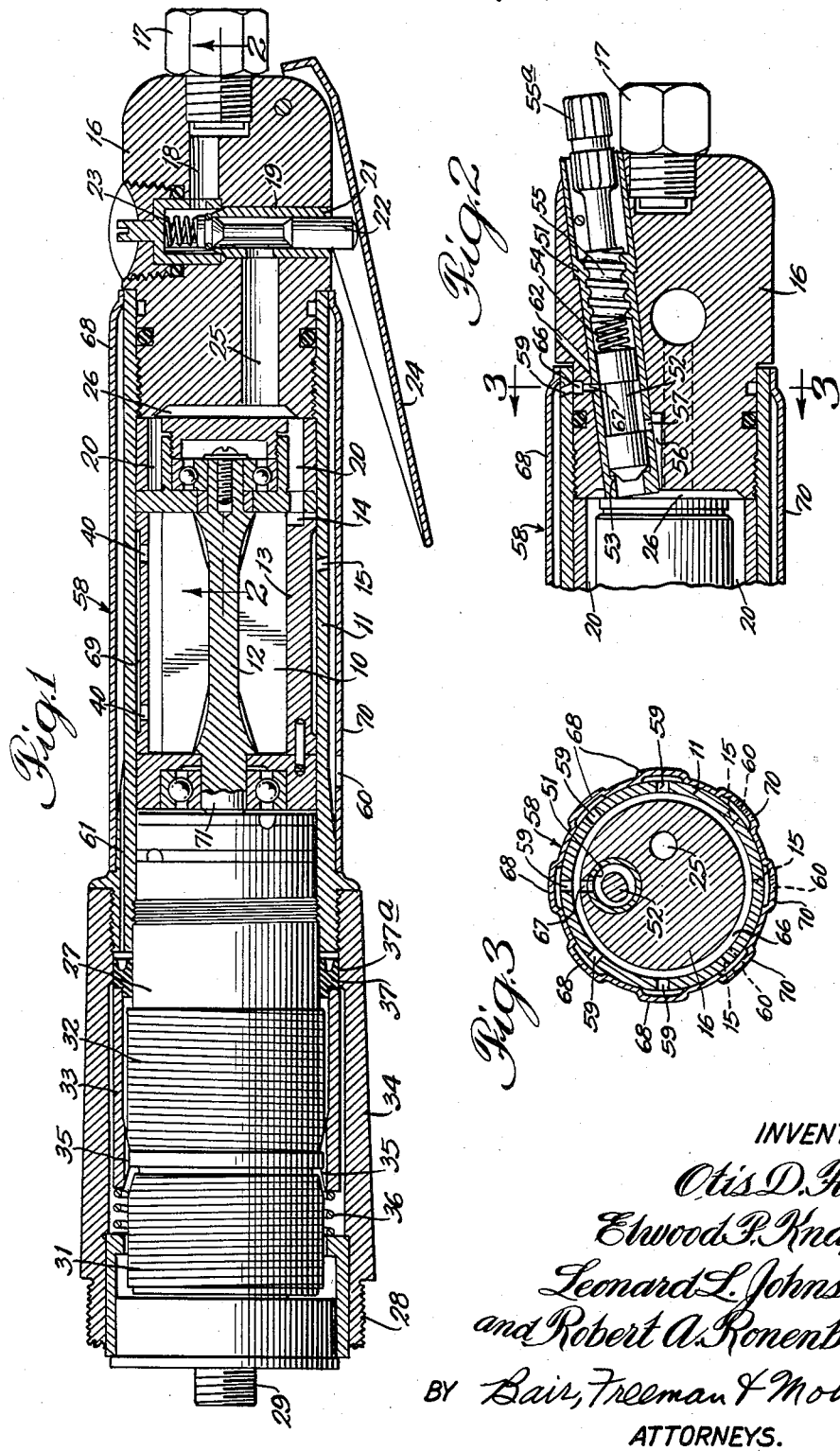
Feb. 9, 1960 — O. D. HITT ET AL — 2,924,114
CONTROL FOR POWER OPERATED TOOLS AND THE LIKE
Filed May 19, 1958
INVENTORS:
Otis D. Hitt,
Elwood P. Knapp,
Leonard L. Johnson
and Robert A. Ronenblum,
BY Bair, Freeman & Molinare
ATTORNEYS.

2,924,114

CONTROL FOR POWER OPERATED TOOLS AND THE LIKE

Otis D. Hitt, Bryan, and Elwood F. Knapp, Brecksville, Ohio, and Leonard L. Johnson, Chicago, and Robert A. Rosenblum, Skokie, Ill., assignors, by direct and mesne assignments, to The Aro Equipment Corporation, Bryan, Ohio, a corporation of Ohio Application May 19, 1958, Serial No. 736,366

8 Claims. (Cl. 74—472)

This invention relates to a control for power operated tools and the like, and more particularly to an automatic control for a multiple speed transmission of the type disclosed in our co-pending application Serial No. 708,419 filed January 13, 1958.

In pneumatically operated power tools such as wrenches, screw drivers and the like, the loading requirements change quickly from relatively high speed-low torque demand for very rapidly taking up initial relatively free movement in a nut, screw or the like, to relatively low speed—high torque demand to provide final tightening of a nut or screw. The condition just referred to is true for nut setters which drive free running nuts and bolts, etc. and for drilling units which drill, for example, an aluminum-steel laminate wherein the aluminum is to be drilled first. The opposite sequence would be required, namely low speed-high torque, shifting to high speed-low torque to complete the operation for unscrewing nuts and bolts, setting self-tapping screws or drilling of the laminate above referred to through the steel first. In the latter operation the low speed-high torque requirement must be met first. To meet these varying requirements, it is desirable to change an operating function of the tool such as the transmission ratio between the motor and load as disclosed in our copending application.

One object of the present invention is to provide a control for tools of the type mentioned, and is illustrated and described herein for automatic control of the transmission ratio although the same control structure could obviously be used for other purposes.

Another object of this invention is to provide a device in which automatic control of the tool function is effected in response to a function of the load requirement on the motor such as torque, speed or variations in the pressure of the air supplied to the motor.

Still another object is to provide a tool in which a pressure responsive control device is utilized to effect changes in the function of the tool and is supplied with air to control the device regulated by a valve which is moved in response to variations in hydrostatic pressure of air supplied to the motor.

According to a feature of the invention, the control valve is constructed to expose a greater area to hydrostatic pressure at the air inlet to the motor after initial operation, thereby to produce a rapid and positive control shift.

The above and other objects and features of the invention will be more readily apparent from the following description when read in connection with the accompanying drawing in which:

Fig. 1 is a longitudinal sectional view through the driving portion of a power tool embodying our present invention with the parts disclosed and claimed in our copending application being shown in elevation;

Fig. 2 is a partial sectional view similar to Fig. 1 and on the line 2—2 thereof; and Fig. 3 is a sectional view on the line 3—3 of Fig. 2.

The invention is illustrated as applied to a pneumatically operated tool including a vane motor indicated generally at 10 which is enclosed in a cylindrical casing 11. The motor includes a rotor 12 carrying vanes which are rotated in a stator 13 of the motor. Air to drive the vanes and turn the rotor is supplied through an inlet port 14 at one end of the motor and the motor may exhaust through the stator 13 as at 40 into an annular space 69, then through one or more ports 15 in the casing 11 and into spaces provided by flutes 68 of a fluted shroud 58 around the casing. The shroud is provided with exhaust ports 65 to atmosphere.

Compressed air is supplied for driving the motor 10 from a valve head 16 secured to one end of the casing 11 and carrying shut-off and transmission control valve mechanisms which will now be described. As shown, the air enters the valve head through a coupling 17 at the outer end thereof and flows into a bore 18 which communicates with a central double-diameter valve bore 19 in the head. The smaller end of the valve bore 19 carries a sleeve 21 fixed therein within which a spool type shut-off valve 22 fits. The spool valve is formed at one end with an enlarged head to seat against the sleeve 21 and is urged against the seat by a spring 23. To open the valve a hand lever 24 is pivoted on the valve head and engages the outer end of the valve spool 22 to unseat the valve when the lever is depressed and to allow air to pass from the passage 18 through a bore 25 into the casing 11 and through the ports 14 into the vane motor. It will be seen that the air flows through a cavity 26 in the control head 16 and through an annular space 20 to enter the inlet port 14.

The rotor 12 has a shaft 71 which projects from the end of the motor opposite to the control head and drives any suitable tool through a transmission indicated generally at 27 and enclosed in an outer casing 34 which forms an extension of the casing 11. The transmission 27 may be constructed as more particularly described and claimed in our copending application above referred to. For mounting the transmission, the casing 34 terminates in a threaded sleeve portion 28 to which a housing for the work engaging element to be driven (not shown) may be attached. A driven shaft 29 projects from the left end of our transmission assembly to be operatively connected to the work engaging element to be driven. The transmission 27 as more particularly disclosed in our copending application is adapted to provide two torque ratios, namely a high speed-low torque ratio for rapid take up and a low speed-high torque ratio for a final tightening or setting. The transmission is controlled through a pair of clutches or coupling elements 31 and 32 which are alternately or selectively engaged to provide the different ratios and connects the rotor 12 and its shaft 71 to the driven shaft 29 which constitutes the load shaft of the transmission.

The clutches 31 and 32 are controlled by means of an actuator in the form of an axially shiftable sleeve 33 fitting within the casing 34 and overlying the clutches. The sleeve 33 terminates in a double tapered head 35 lying between the coupling elements and is urged to the right as shown by a spring 36 to engage the clutch 32. When the sleeve is urged to the left, it will release the clutch 32 and engage the clutch 31. In the construction as shown, engagement of the clutch 31 will produce a high speed-low torque drive and engagement of the clutch 32 will produce a low speed-high torque drive. According to the present invention the sleeve 33 is shifted automatically in response to the torque of the drive motor 10 to shift to the low speed-high torque drive when the load demands impose a predetermined torque on the motor. For this purpose the sleeve 33 terminates at its right-hand end in an annular piston 37 fitting into a cylinder-like portion of the casing 34 and surrounding the transmission casing 27. The piston 37 is adapted to be urged toward the left against the action of the spring 36 by the application of fluid pressure thereto.

Supply of operating fluid to the piston 37 is controlled by a control valve best shown in Fig. 2. The control valve includes a sleeve 51 fitting into a bore in the control head to receive a spool valve 52 which is normally urged against a reduced seat 53 at one end of the sleeve by a spring 54. The tension of the spring may be adjusted by an adjustable plug 55 screw-threadedly fitting into the sleeve 51. The adjustment permits the valve 52 to respond when the desired torque output conditions are encountered, at which time the speed ratio shift will occur. The plug 55 can be adjusted so that the valve can, if desired, remain at either extreme position to produce continuous high speed or continuous low speed operation. The plug 55 has a knob 55ª to be manually engaged for this purpose.

The valve seat 53 opens into the cavity 26 and the annular space 20 through which the air supply passes to the motor 10 so that the pressure in the cavity and on the valve seat will be determined by the pressure at the motor inlet port 14. This pressure normally acts on that area of the spool valve 52 which is exposed through the seat 53 and also in the space between the two enlargements of the spool valve. When the pressure acting on the total area of the spool valve becomes sufficient to overcome the spring 54, the spool valve will be shifted to the right.

In its normal left-hand position the valve plunger establishes fluid communication between the cavity 26 and the annular piston 37. For this purpose a passage 56 is formed around one side of the sleeve 51 and communicates through a port 57 in the sleeve and around the reduced center portion of the spool valve 52 with passages leading to the annular piston 37. As shown, these passages are formed by the flutes 68 of the shroud 58 which fits tightly around the casing 11. The flutes communicate through ports 59, an annular space 66 and a port 67 with the valve 52. When the valve is in its normal high speed position, as shown in Fig. 2 air from the cavity 26 will flow through passage 56, ports 57 and 67, annular space 66 ports 59 and the passages formed by the flutes 68 in the shroud 58, in addition to one or more drilled passages 61 (see Fig. 1) in the casing 11 to the piston 37. The spring 36 may be relatively light so that any pressure sufficient to operate the motor when the valve 22 is open will shift the actuator sleeve 33 to the left to energize the clutch 31 and de-energize the clutch 32. Therefore, the transmission will operate in its high speed-low torque driving condition to take up rapidly any free movement in the work engaging element to be driven.

To insure free passage of air for actuating the piston 37, there may be a plurality of ports 59 communicating with a plurality of passages formed by the flutes 68, as shown in Fig. 3, so that there will be no restriction of the air supply. Also, as indicated in Figs. 1 and 3, the exhaust ports 15 in the casing 11 may communicate with passageways formed by flutes 70 of the shroud 58 which are provided with exhaust ports 60 (see Fig. 1) so that air from the motor may be exhausted freely to atmosphere. As shown in Fig. 3 there are five upper flutes 68 and three lower flutes 70.

As the free movement of the load is taken up and the torque demands increase, the hydrostatic pressure at the motor inlet will increase until it acts on the total area of the spool valve 52 exposed at the seat 53 and such action becomes sufficient to overcome the spring 54. At this time the valve will move to the right and as soon as the port 57 is closed the valve will shift rapidly and positively. When so shifted the valve 52 will connect the ports 59, annular space 66 and port 67 of the valve head 16 to an exhaust passage 62 in the head. This vents the pressure acting on the annular piston 37 to atmosphere and the actuator sleeve 33 will be moved to the right by the spring 36 to release the clutch 31 and to engage the clutch 32. The transmission is thereby shifted from high speed-low torque driving condition to its low speed-high torque condition for final tightening or setting of the work.

It will be apparent that instead of changing the ratio of a transmission as described herein above, the control device of the present invention could be utilized to change some other function of the unit such, for example, as the pressure of air supplied to the driving motor or the like. Therefore, while the invention has been described in connection with one particular embodiment it will be understood that the scope of the invention is not limited thereto other than by the terms of the appended claims.

We claim as our invention:

1. A control for a work engaging element having a pneumatically operated motor therefor and driving ratio changing means between the motor and the work engaging element, movable control means to change the driving ratio of said means, means to supply air to the motor, a pressure responsive device connected to said movable control means to move it, a connection from a source of pressure to said pressure responsive device, a control valve in said connection, and means responsive to the pressure of air from the motor in the supply means to operate said control valve.

2. A control for a work engaging element having a pneumatically operated motor therefor and driving ratio changing means between the motor and the work engaging element, movable control means to change the driving ratio of said means, means to supply air to the motor, a pressure responsive device connected to said movable control means to move it, a connection from a source of pressure to said pressure responsive device, a valve in said connection, a spring urging said valve in one direction, and a part on said valve exposed to the supply means to move the valve in the other direction in response to the hydrostatic pressure of air from the motor.

3. A control for a work engaging element having a pneumatically operated motor therefor and driving ratio changing means between the motor and the work engaging element, movable control means to change the driving ratio of said means, means to supply air to the motor, a pressure responsive device connected to said movable control means to move it, a connection from a source of pressure to said pressure responsive device, a valve in said connection including a slidable plunger movable to one position to supply air to the device and to another position to vent the device, a spring urging said plunger toward said one position, a seat of smaller diameter than said plunger through which one end of the plunger is exposed to the supply means to be urged toward said other position, and a valve member on said one end of said plunger to seat on said seat.

4. A control for a work engaging element having a pneumatically operated motor therefor, a gear set connected to the motor to connect it to the work engaging element, a piston for the gear set shiftable to change the driving ratio through the gear set, means to supply air to the motor to operate it, a spring urging said piston in one direction to establish one driving ratio in the gear set, and means responsive to the pressure of air from the motor in the supply means to control the supply of air to said piston to urge the sleeve in the other direction.

5. A control for a work engaging element having a pneumatically operated motor therefor, a gear set connected to the motor to connect it to the work engaging element, a piston for the gear set shiftable to change the driving ratio through the gear set, means to supply air to the motor to operate it, a spring urging said piston in one direction to establish one driving ratio in the gear set, a connection from the supply means to said piston to urge it in the other direction, a valve in said connection, and means responsive to the hydrostatic pressure of air from the inlet to the motor to control said valve.

6. A control for a pneumatically operated power tool or the like comprising a single air driven motor, means to supply air to the motor to operate it, shiftable power transmission means to connect the motor to a load, control means to shift said power transmission from one torque-to-speed relationship to another, a pressure responsive device connected to said control means to operate it, a valve controlling supply of pressure to said motor, and means responsive to the pressure of air from the motor in the supply means to operate said valve.

7. In a control for a pneumatically operated tool or the like comprising an air driven motor and a gear set connected to the motor to connect it to a load, movable control means in the gear set to change the driving ratio therethrough, means to supply air to the motor, and means responsive to the pressure of air from the motor at the inlet thereto to move said movable control means thereby to change the driving ratio of the gear set.

8. A control valve of the character disclosed comprising a spring close spool valve having a valve plug, a valve seat against which said plug is seated, said valve seat being of less diameter than the spool valve and being connected to the inlet of a fluid pressure motor, said spool valve being adapted to control a clutch for the motor in response to pressure through said valve seat, said spool valve in its closed position affording communication from the motor inlet to the clutch for positioning it one position, and in another position closing off the communication between the motor inlet and the clutch and exhausting air from the clutch to atmosphere.

References Cited in the file of this patent

UNITED STATES PATENTS

| | | |
|---|---|---|
| 2,418,880 | Haynes et al. | Apr. 15, 1947 |
| 2,720,803 | Rice et al. | Oct. 18, 1955 |
| 2,825,353 | Voytech | Mar. 4, 1958 |